United States Patent [19]

Bunn

[11] Patent Number: 4,641,350

[45] Date of Patent: Feb. 3, 1987

[54] FINGERPRINT IDENTIFICATION SYSTEM

[76] Inventor: Robert F. Bunn, 6803 Pamela La., Clinton, Md. 20735

[21] Appl. No.: 611,131

[22] Filed: May 17, 1984

[51] Int. Cl.⁴ .............................................. G06K 9/00
[52] U.S. Cl. ......................................... 382/4; 356/71; 382/30; 382/34
[58] Field of Search .................... 382/4, 5, 27, 30, 34, 382/48; 356/71

[56] References Cited

U.S. PATENT DOCUMENTS

| | | | |
|---|---|---|---|
| 3,200,701 | 8/1965 | White | 382/4 |
| 3,201,961 | 8/1965 | Williams et al. | 382/4 |
| 3,383,657 | 5/1968 | Claassen et al. | 382/4 |
| 3,527,535 | 9/1970 | Monroe | 356/71 |
| 3,581,282 | 5/1971 | Altman | 382/2 |
| 3,584,958 | 6/1971 | Miller | 382/4 |
| 3,905,045 | 9/1975 | Nickel | 382/48 |
| 3,944,978 | 3/1976 | Jensen et al. | 356/71 |
| 3,975,711 | 8/1976 | McMahon | 356/71 |
| 4,053,228 | 10/1977 | Schiller | 382/4 |
| 4,110,737 | 8/1978 | Fahey | 382/30 |
| 4,185,270 | 1/1980 | Fischer et al. | 382/5 |
| 4,186,378 | 1/1980 | Moulton | 382/5 |
| 4,200,861 | 4/1980 | Hubach et al. | 382/30 |
| 4,210,899 | 7/1980 | Swonger et al. | 382/5 |
| 4,246,568 | 1/1981 | Peterson | 382/4 |
| 4,435,835 | 3/1984 | Sakow et al. | 382/48 |
| 4,450,579 | 5/1984 | Nakashima et al. | 382/48 |
| 4,479,145 | 10/1984 | Azuma et al. | 382/48 |
| 4,525,859 | 6/1985 | Bowles et al. | 382/5 |
| 4,581,760 | 4/1986 | Schiller et al. | 382/4 |

Primary Examiner—Leo H. Boudreau
Assistant Examiner—Joseph Mancuso
Attorney, Agent, or Firm—Barnes & Thornburg

[57] ABSTRACT

A fingerprint identification system includes a scanner, a memory for storing data representative of fingerprints received from the scanner, means for comparing newly received data to reference data, and means for determining the degree of distortion and misregistration present in the new data relative to the reference data. The new data and the reference data are stored in arrays. The arrays are compared by a method which includes dividing the reference array into sub-arrays and comparing the elements of each sub-array with the elements of a number of sub-arrays of the new data array. This technique allows the reference array to be stretched and/or compressed to account for distortion and/or misregistration in the new data array. Apparatus designed to insure nominal finger registration and to protect the optical surface of the scanner from dirt, grease and other contamination is also provided.

20 Claims, 11 Drawing Figures

FINGERPRINT IDENTIFICATION SYSTEM

BACKGROUND AND SUMMARY OF THE INVENTION

This invention relates generally to identification systems and in particular to identification of individuals by comparison of fingerprint patterns.

It has long been recognized that certain personal features are unique to an individual and can be used as a means of positive identification. One such feature that is frequently chosen for this purpose is the fingerprint. U.S. Pat. Nos. 3,383,657; 3,527,535; 4,185,270 and 4,210,899 all describe identification systems which are based on fingerprint pattern recognition techniques.

In general, techniques such as those described in the above-mentioned patents involve scanning a selected fingerprint pattern, converting the pattern information into an electrical signal, and storing or processing the information (e.g., by comparing it to prestored information) to effect an identification. Scanning is generally accomplished by opto-electronic means which avoids the use of inks or other undesirable materials. U.S. Pat. No. 3,527,535 to Monroe describes several methods using different types of glass prisms and illumination means to produce a visible or scannable fingerprint pattern. Other systems described in the literature have used an illuminated right angle prism and the technique of frustration of total internal reflection to produce a visible and scannable image. These systems depend for their success on the fact that the ridges of the skin on the finger contact a smooth, clean optical surface while the valleys do not. While it is seldom mentioned in the literature, the practical application of such an optical system requires a thorough cleaning after each use to remove the oils, water and dirt deposited on the surface by the finger. If these deposits are not removed, a residual image caused by them may be seen and subsequent operation of the system will be severely affected.

Another problem often experienced in fingerprint recognition systems involves registration of a fingertip in the proper position for scanning. Some existing systems use a jig or guide in an attempt to position the finger in the same location and orientation on the scanner for each use. While this is generally a desirable feature, it cannot be relied on to produce re-registration of the fingerprint to the exact same location on the surface of the optical element of the scanner for every subsequent scan performed. Accordingly, some degree of misregistration usually occurs. In an image matching system, there will be some degree of correlation between similar, but not identical, images. Thus, a system which does not provide accurate registration capability will experience difficulty in distinguishing between similar images and misregistered identical images.

Difficulties in identifying a known fingerprint pattern by comparison to a subsequently scanned identical pattern can also be caused by distortion. As used here, the term distortion refers to changes in the relative locations of ridges and valleys in a fingerprint pattern which can result from a number of causes. For example, the flesh beneath the skin is plastic and can be deformed with reasonable amounts of force or pressure. This property allows a relatively large area of a fingerprint pattern to be scanned since the fingertip is generally pressed against a flat optical element surface for scanning. However, a certain degree of relative distortion between fingerprint patterns scanned at different times can result when different amounts of pressure are applied in pressing the fingertip against the optical surface. Non-uniform pressure or force components acting on the fingertip which are not normal to the flat optical surface can also result in distortion being introduced. Considering the plastic nature of the flesh and skin surrounding the bone on the finger, it is easy to see that such forces can cause pattern displacements equal to several ridge-valley separations. Other factors, such as large weight gains or losses by the individual and large ambient temperature variations, have also been shown to produce relative distortions in fingerprint images. While the effects here are relatively small (generally on the order of less than 3 percent), they can be sufficient to adversely affect the accuracy of a comparison.

An object of the present invention is to provide an apparatus which prevents deposition of dirt, oils and water on the surface of an optical element in a scanning device.

Another object of the present invention is to provide a method and apparatus for comparing data arrays representative of fingerprint patterns which compensates for misregistration of the fingertip on the scanner.

A further object of this invention is to provide a method and apparatus for comparing data arrays representative of fingerprint patterns which compensates for distortion, relative to an original scan pattern, introduced into fingerprint patterns produced by subsequent scans.

These and other objects are attained in an apparatus for identifying fingerprint patterns comprising: an opto-electronic scanner for scanning fingerprint patterns; threshold circuits for reducing the electronic signal to a binary array of 1's and 0's; memory for storing the initial or reference data arrays; additional memory for storing subsequent or new scanned data arrays; means for comparing the reference and new data arrays; means for determining the degree of correlation between the reference and new data arrays; means for determining the degree of distortion between the reference and new data arrays; and means for producing an indication signal when the correlation value exceeds a pre-set threshold and when the distortion value is below a pre-set threshold.

The reference data array will be referred to as an $X \times Y$ array and the new scan data array will be referred to as an $M \times N$ array. In the example to follow $M > X$ and $N > Y$.

A preferred method of comparing the $M \times N$ data array to the previously stored $X \times Y$ reference data array comprises the steps of: dividing the $X \times Y$ array into a plurality of sub-arrays; comparing individual elements of an $X \times Y$ sub-array with corresponding elements of a sub-array of the $M \times N$ array and generating a correlation value indicative of the degree of correlation existing between the corresponding elements; repeating the comparison step for a number of sub-arrays of elements of the $M \times N$ array; identifying a highest correlation value generated in these comparisons; repeating the comparison steps for each of the plurality of $X \times Y$ sub-arrays; and comparing the highest correlation values identified to a predetermined threshold value to determine whether or not a sufficient correspondence exists to indicate a match. As will be described in more detail below, the $X \times Y$ reference array in one embodiment of the invention is preferably divided into four sub-arrays (i.e., quadrants). Comparison of the elements of each sub-array with a number of sub-arrays of elements of the M ×N array results in compensation for both misregistration and distortion introduced when a scan is performed to generate the M×N array.

The comparison of elements of the X×Y sub-arrays and the M×N sub-arrays is preferably performed by executing a logical "exclusive or" operation, using the elements of the X×Y sub-array and the elements of the M×N sub-array as inputs, to generate a correlation value by counting the number of matches which occur when all elements of an X×Y sub-array are compared to all corresponding elements of an M×N sub-array. In an especially preferred method, the location in the M×N array of the sub-array having the highest degree of correlation with the X×Y sub-array is identified. The displacement of the sub-arrays having the highest correlation values from the location which would result from scanning a perfectly registered and undistorted fingerprint pattern provides a measure of the misregistration and relative distortion of the pattern being compared. This distortion measure can be used, along with the peak correlation values themselves, to determine if a match has occurred. Thus, an accurate comparison can be made even in the presence of misregistration and distortion. An especially preferred method involves summing the highest correlation values generated for each X×Y sub-array and corresponding M×N sub-array, dividing the total by the measure of relative distortion to produce a correlation value-to-distortion ratio, and comparing the ratio to a pre-determined threshold value.

A preferred method of processing the correlation values as they are generated by the comparisons described above involves creation of a correlation array whose elements represent the degree of correlation existing between elements of an X×Y sub-array and the elements of each of the M×N sub-arrays to which the X×Y sub-array is compared.

An advantageous embodiment of the present invention includes additional apparatus to position the fingertip over a viewing surface of an optical element of the scanning device. An especially advantageous embodiment includes provision of a transparent film over the viewing surface to prevent the fingertip from contacting the surface directly. The transparent film can be moved, or indexed, relative to the viewing surface, to provide a clean contact surface for the fingertip on subsequent scans. Indexing of the film preferably takes place automatically after a comparison is performed. The transparent film apparatus may include a length of clear, plastic film, a supply reel, a take-up reel and drive means for at least one of the two reels.

Other objects, advantages and novel features of the present invention will become apparent from the following detailed description of the invention when considered in conjunction with the accompanying drawings.

DETAILED DESCRIPTION OF THE DRAWINGS

Figure 1:
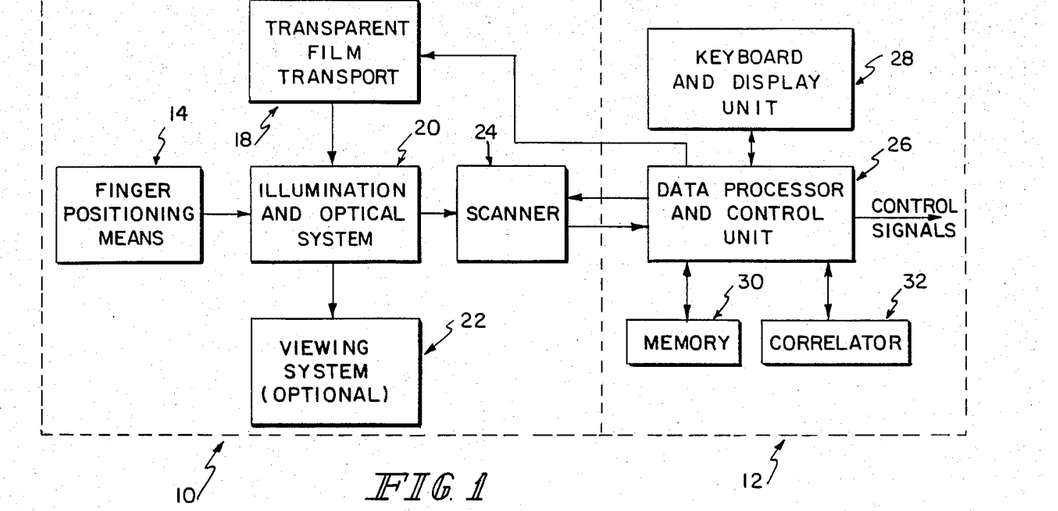
FIG. 1 shows a block diagram of a fingerprint identification system according to the present invention.

FIG. 1, which illustrates a preferred embodiment of the fingerprint identification system, shows a system having a data input section 10 and a processing and control section 12. Input section 10 includes finger positioning means 14, transparent film transport 18, illumination and optical system 20, optional viewing system 22 and scanner 24. Finger positioning means 14 and transparent film transport 18 are discussed with reference to FIGS. 2a and 2b below. Illumination and optical system 20 provides a means for illuminating the viewing surface of an optical element, such as a prism, and a lens for relaying the image formed to scanner 24. Optical viewing system 22 can be added by placing a beam splitting mirror in the optical path between optical system 20 and scanner 24. A viewing system of this type is shown in U.S. Pat. No. 3,975,711.

Scanner 24 is an opto-electronic device which scans the image formed by optical system 20 and converts the image into electrical signals. Scanner 24 is provided with circuitry which converts the analog image signal into a digital bit stream with one logic level representing a dark pixel and the other logic level representing a light pixel. Scanning is accomplished in a raster format so that the location of the data bits is representative of the location of the pixels on the finger. In this preferred embodiment, scanner 24 is a square array of 100×100 photosensitive cells such as that produced commercially by RETICON. It should be noted that any scanning system may be employed which will convert the optical image into electrical signals. Optical system 20 is selected such that scanner 24 scans an area on the prism face of approximately 0.5×0.5 inches. Thus, each pixel in the 100×100 array represents an area on the fingerprint pattern of approximately 0.005×0.005 inches. This resolution is more than sufficient for the highest fingerprint ridge density (80 lines per inch) found in the general population.

Control section 12 includes data processor and control unit 26, keyboard and display unit 28, memory 30 and correlator 32. Data processor and control unit 26 is preferably a standard commercially available microprocessor, although a larger computer could be used on a dedicated or time-shared basis. Data processor 26 controls and receives data from scanner 24, formats and stores the data in memory 30 (which may be an integral part of processor 26), controls and processes the results from the comparison performed in correlator 32, and outputs control signals based on stored accept/reject criteria.

Keyboard and optional display unit 28 provides means for an individual to initiate the identification process by entering an assigned identification number. This mechanism can be used to reduce processing time by identifying a reference file or array against which the newly entered data will be compared. Alternatively, each newly entered data array can be compared against all reference arrays stored in memory 30.

Although data processor 26 could be used to compare newly input fingerprint data to stored reference data, the preferred embodiment uses special purpose digital circuits, which operate under the control of data processor 26, represented on the block diagram of FIG. 1 by correlator 32. As described below, the comparison process includes performing a logical "exclusive or" operation between elements of the arrays. This operation can be performed much faster in a special purpose circuit such as the TDC 1023J integrated circuit produced by TRW, Inc.

Figure 2A:
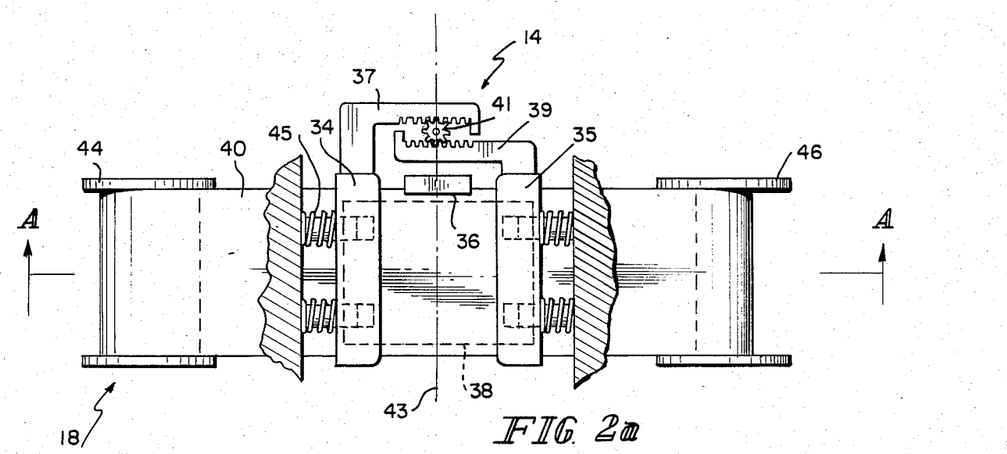
FIG. 2a shows a schematic view, and FIG. 2b a sectional view, of the finger positioning and transparent film transport apparatus.
Figure 2B:
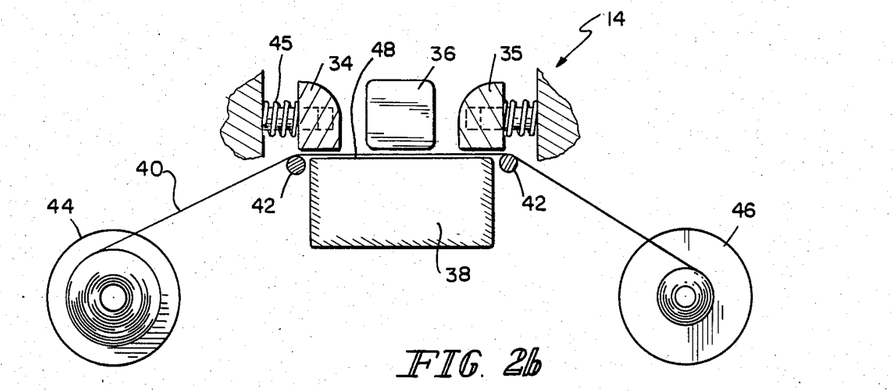

Referring now to FIGS. 2a and 2b, there is illustrated an embodiment of finger positioning means 14 and transparent film transport 18. Finger positioning means 14 includes spring-loaded guides 34 and 35 and stop 36. Guides 34 and 35 are mechanically constrained and free to open and close while remaining perpendicular to the finger stop and parallel to one another. The finger guides are preferably mechanically coupled together so as to move equal amounts in opposite directions when forced apart by the placement of the finger. This is illustrated in FIG. 2a by the rigid attachment of toothed rack members 37 and 39 to guides 34 and 35, respectively. The teeth on rack members 37 and 39 coact with pinion gear 41 to cause equal and concurrent movement of the guides away from center line 43 when a finger is positioned between them. Springs, such as the one shown at 45, are provided to return guides 34 and 35 to their original positions.

This arrangement for positioning a fingertip adjacent to optical element 38 has been found to provide a nominally repeatable registration of a finger on successive trials. Guides 34 and 35 act to center the finger above the prism surface and, thus, prevent the occurrence of very large registration errors. As will be shown below, exact re-registration of the finger is not required in the present invention, since registration errors are compensated for in the processing of the scan data.

Transparent film transport 18 includes clear, plastic film 40, guide rollers 42, supply reel 44, take-up reel 46 and a drive mechanism (not shown) for one or both of the reels. Indexing of the film after each scan operation is controlled by the data processor and control unit 26. A preferred approach to controlling the amount of film transported on each indexing operation is through use of a stepping motor and a capstan drive. Film 40 is arranged to pass over viewing surface 48 of optical element 38 on which a fingertip is to be positioned for scanning. Guide rollers 42 support film 40 parallel to viewing surface 48 and prevent rubbing of the film on the edges of element 38. Supply reel 44 and take-up reel 46 provide means for indexing film 40 between each operation of the system by an amount slightly greater than the width of a finger.

In operation, an individual places a finger between guides 34 and 35 (forcing them to open) and against stop 36. The finger is pressed against plastic film 40 which is moved into contact with viewing surface 48. Film 40 becomes, in effect, a new viewing surface for optical element 38 with light being transmitted through the plastic to be absorbed by the skin or reflected by the air-plastic interface, thus, forming an image of the fingerprint as before. The indices of refraction of the optical element material and plastic film 40 do not have to be matched and a great deal of freedom in choice of materials exists. Film 40 protects viewing surface 48 from contamination by oils, dirt and water present on the fingertip which might otherwise cause the system to err. Film 40 is indexed or moved by drive means, preferably under the control of data processor 26, after each use so that a clean surface is presented for each subsequent scan.

When the system is initially set up, a reference scan is performed and an $X \times Y$ reference data array is stored in memory 30. A file system in the software is used to define the store locations, with each fingerprint file assigned an identification number so that the data may later be recalled for comparison with new scan data.

Figure 3:
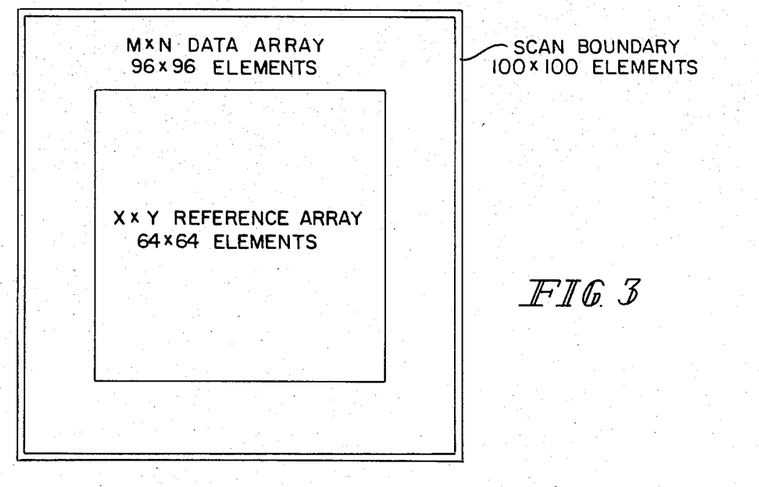
FIG. 3 shows a schematic representation of the arrays generated by the scanner.
Figure 4A:
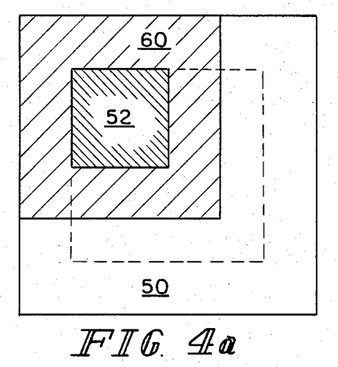
FIGS. 4a–4d show the reference (X×Y) data array divided into four sub-arrays, each overlaying a larger sub-array of the M×N new scan data array.
Figure 4B:
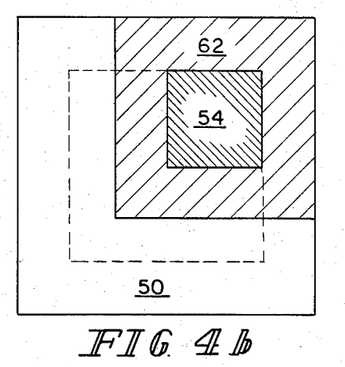
Figure 4C:
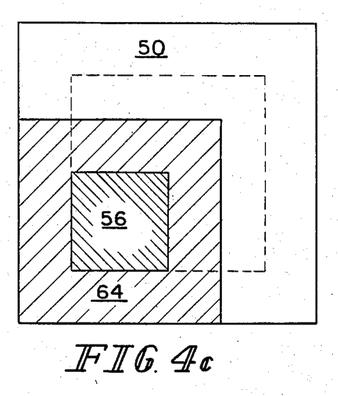
Figure 4D:
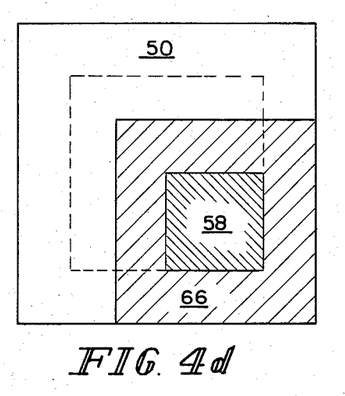

For purposes which will become clear later, the stored $X \times Y$ reference array is formed from a central sub-set of the total scan data. FIG. 3 shows in pictorial form the relationship of the $X \times Y$ reference array to the total scan data. The size of the $X \times Y$ reference array is shown, for illustrative purposes, as $64 \times 64$ bits. Larger or smaller arrays can be used successfully, as can rectangular arrays. For processing purposes, the reference data is broken into sub-arrays, or quadrants, and use of a $64 \times 64$ element array means that each quadrant will be $32 \times 32$ elements in size. This organization takes advantage of the fact that most computers are designed to process data in multiples of 8 bit bytes, and this organization simplifies the computer programming.

When the reference file containing an $X \times Y$ reference array for each individual is established, the system is ready to be used for personal identification. The individual to be identified enters an ID number and positions a finger for scanning. Under the control of data processor 26, a "new" scan of the fingerprint is made and an $M \times N$ data array is stored in memory 30. Again, for ease of computer program design, the total scan data is reduced to a central sub-set to form the $M \times N$ array which, in this preferred method, comprises $96 \times 96$ elements.

For the comparison process, the $X \times Y$ reference array is divided into a number of sub-arrays. Each sub-array is then compared to a corresponding sub-array of elements of the $M \times N$ data array by performing logical "exclusive or" operations using, as inputs, each element of the $X \times Y$ sub-array and a corresponding element of the $M \times N$ sub-array. The $M \times N$ sub-array is selected to be larger than the $X \times Y$ sub-array in both dimensions to permit a search for a best match at many possible locations. As a result of the "exclusive or" operations, a count of the number of matching elements is produced. This count is called the correlation value. The reference sub-array is then "moved" on the $M \times N$ sub-array and another comparison is performed. This comparison produces a second correlation value. The process is repeated for all possible locations of the $X \times Y$ sub-array in the $M \times N$ sub-array and produces a correlation sub-array of size $(M-X+1) \times (N-Y+1)$. This entire process is then repeated for each of the remaining $X \times Y$ sub-arrays with the corresponding $M \times N$ sub-arrays.

The division of the $X \times Y$ array into a number of sub-arrays allows a best possible match to be found for each sub-array of the $X \times Y$ array and a corresponding sub-array of the $M \times N$ array. This match is not influenced by the remaining elements in the arrays. This provides a degree of distortion compensation by, in effect, allowing the $X \times Y$ array to be effectively stretched or compressed with respect to the $M \times N$ array. A division by a factor of 2 in each of the X and Y directions is the simplest possible case. However, division by a factor of 3, 4 or a greater number is possible. In practice, a factor of 2 has been proven to provide effective distortion compensation and to provide dramatic improvement in the accuracy of fingerprint comparisons. Using a factor of 3 or higher would provide even more precise distortion compensation, but at the expense of computer program complexity and slightly greater processing time.

FIGS. 4a–4d shows a representations of the $X \times Y$ reference sub-arrays in relation to the $M \times N$ data array and $M \times N$ sub-arrays. The $M \times N$ data array is denoted by reference numeral 50. The sub-arrays of the $X \times Y$ reference array are denoted by numerals 52, 54, 56 and 58. The sub-arrays of the $M \times N$ array, with which each of the corresponding $X \times Y$ sub-arrays are compared, are bounded by the areas denoted by numerals 60, 62, 64 and 66, respectively. The dashed lines represent the original boundaries of the undivided $X \times Y$ array.

As noted, a correlation value is generated for each comparison between an $X \times Y$ sub-array and each possible location in areas 60, 62, 64 and 66, respectively. These values are temporarily stored in correlation arrays. Thus, there will be four correlation arrays generated—one for each of the four $X \times Y$ sub-arrays.

The next step in the processing is to perform a search through the correlation arrays for the location of the highest correlation value in each array. The highest possible value which could occur in each array is $Z^2$, where the size of the corresponding reference sub-array is $Z \times Z$ elements. A value this large will seldom occur in practice since it would imply a perfect match between each element in the sub-array and the corresponding sub-array of the $M \times N$ array. By the same analysis, the minimum possible value which could occur in the correlation array is zero. This is also highly improbable since it would imply a perfect mismatch. In both the $X \times Y$ reference data array and the $M \times N$ new data array, there will probably be about as many ones as zeros. Thus, even for fingerprint patterns which are dissimilar, a correlation value will be produced which will be on the order of $Z^2/2$. For patterns which are similar, the highest correlation value in the correlation array will be between $Z^2/2$ and $Z^2$. The greater the degree of similarity, the closer the highest correlation value will be to $Z^2$. While these highest correlation values could be compared to respective threshold levels and a decision regarding identification made at this time, it is preferred to continue the processing as will now be described.

If there were no registration errors between the reference data and the new scan data, the highest correlation value in each of the corresponding correlation sub-arrays would correspond to the values generated by the comparisons performed with the sub-arrays positioned as shown in FIGS. 4a–4d. The correlation sub-arrays are arranged so that the correlation values produced when the reference sub-arrays are in this "original" or zero registration error position lie in the geometric center of the correlation sub-array. As noted, it is almost impossible to position the finger in exactly the same place on subsequent scans. Thus, there will usually be some registration error. The displacement of the highest correlation value in the particular correlation array from the geometric center of the array is a measure of the registration error. The process of performing comparisons between sub-arrays of the reference data and sub-arrays of the new scan data in all possible positions of respective areas 60, 62, 64, and 66 permits accurate comparison of fingerprint patterns in the presence of registration errors. The $M \times N$ data array is intentionally made larger than the $X \times Y$ reference data array by an amount sufficient to account for any registration errors resulting from imperfect operation of finger positioning means 14.

If there are no relative distortions between the $X \times Y$ reference data array and the $M \times N$ new scan data array, the highest correlation values in each of the four correlation arrays will be displaced from the center position by the same amount and in the same direction. In practice, however, there will usually be distortions due to differences in finger pressure applied during the two scans, rotation of the finger due to finger guide imperfections, or other reasons. The four sub-array processing technique provides a degree of elasticity in comparing the reference data array and the new scan data array, permitting the match producing the highest correlation value to be identified, notwithstanding the presence of relative distortion. The degree to which the location of the highest correlation value in a correlation array departs from the average location of the highest correlation values in all four arrays is a measure of the relative distortion. This parameter can be useful in determining whether or not a new scan pattern matches with a stored reference pattern. In practice, a matching pattern will seldom exhibit more than one or two units of relative distortion. Patterns from different fingers may sometimes produce relatively large maximum correlation values but will also produce large distortion distance values.

The preferred accept/reject decision criterion is based on a combination of the highest correlation values and the computed distortion distance. First, the highest correlation values from each correlation array are summed to produce a total. This peak correlation value is then compared to a predetermined threshold value as the first criterion for a successful match.

The displacement of the peak value in each of the correlation arrays from the zero error position is, of course, a vector quantity. The average value of these four vectors is a vector denoting the average registration error between the reference data and the new data. The difference between the average registration vectors and each of the four correlation array vectors produces four distortion vectors. The sum of the magnitudes of these four distortion vectors will be referred to as the distortion distance. Since the distortion distance should not exceed a predetermined threshold value, this measure provides a second criterion for a successful match.

These two criteria can be used in a sequential fashion to determine acceptance or rejection, or they may be combined by dividing the peak correlation value by the distortion distance and comparing this value to a predetermined threshold value. Care must be taken in the later case to recognize that the distortion distance could, on occasion, be zero, and the computer program designed to give a correct response.

Figure 5A:
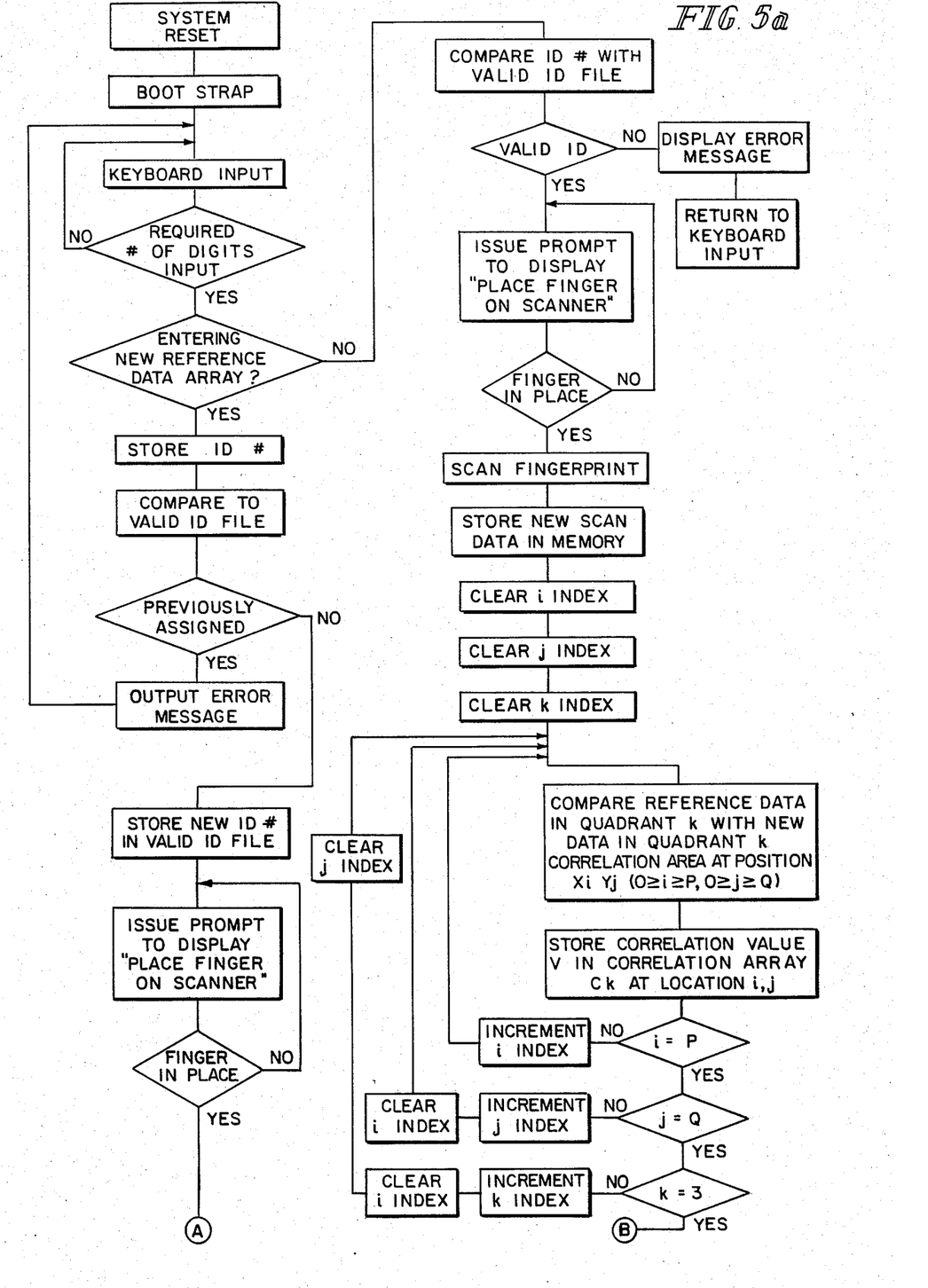
FIGS. 5a–5c are generalized flow-chart diagrams of the comparison procedure.
Figures 5B, 5C:
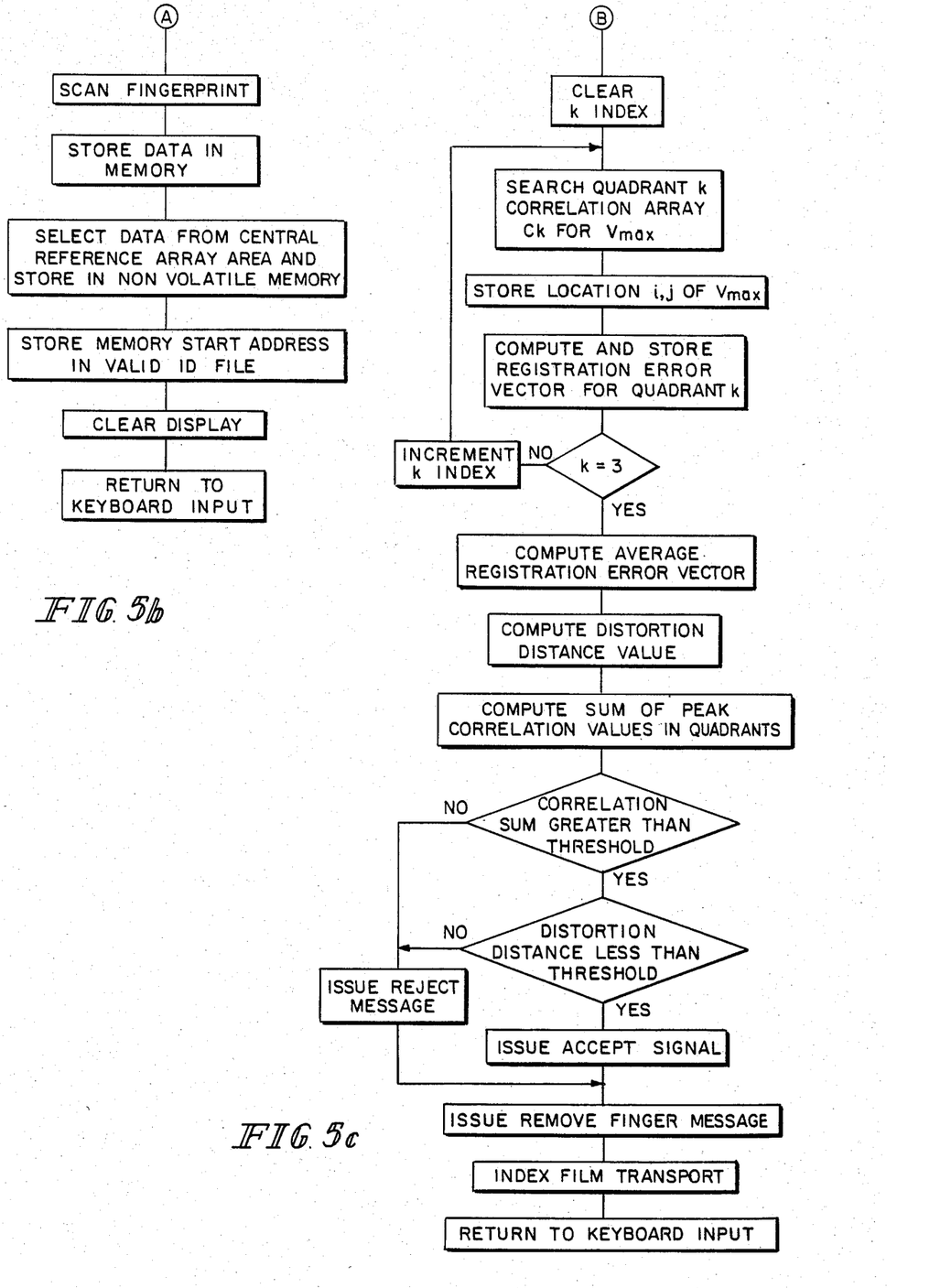

FIGS. 5a–5c show, in flow chart form, the program steps required to implement the present identification system. These flow charts are self-explanatory and, thus, will not be reviewed here in detail. However, prominent features of the system illustrated in the charts include: a keyboard for entry of a personal code; provision for entering new reference data arrays into memory; comparison of new scan data to reference data, including correction for registration and distortion errors; automatic indexing of the tape transport; and a number of prompting messages displayed to the operator.

Although a preferred embodiment of the present invention has been described and illustrated in detail, variations will occur to those skilled in the art. For example, the number of sub-arrays into which the reference array is divided can vary. Moreover, the number of reference arrays stored can vary, with multiple comparisons being performed for each new data array entered. Furthermore, while the description above relates to the identification of a single fingerprint, identification of multiple fingers, presented in a sequential manner using a single scanner or in a parallel manner using multiple scanners, can be used to further enhance system performance. It is therefore intended that the spirit and scope of this invention be limited only by the terms of the appended claims.

What is claimed is:

1. A machine method of comparing an M×N data array to an X×Y data array, said arrays being representative of fingerprint patterns, comprising the steps of:
   A. dividing said X×Y array into a plurality of sub-arrays;
   B. comprising elements of a sub-array of said X×Y array with elements of said M×N array and generating a correlation value indicative of the degree of correlation existing between corresponding elements;
   C. repeating step B for a plurality of sub-arrays of elements of said M×N array;
   D. identifying a highest correlation value generated in step C;
   E. repeating steps B, C and D for each sub-array of said X×Y array;
   F. identifying a relative location of said sub-arrays corresponding to said highest correlation values to provide a measure of relative distortion of said fingerprint patterns; and
   G. comparing said highest correlation values and said measure of relative distortion to respective predetermined threshold values.

2. The method of claim 1, wherein said comparing operation of Step G includes:
   summing said highest correlation values to produce a total;
   dividing said total by said measure of relative distortion to produce a correlation value-to-distortion ratio; and
   comparing said ratio to a predetermined threshold value.

3. A machine method of comparing an M×N array to an X×Y data array, said arrays being representative of fingerprint patterns, comprising the steps of:
   A. dividing said X×Y array into a plurality of sub-arrays;
   B. comparing elements of a sub-array of said X×Y array with elements of said M×N array and generating a correlation value indicative of the degree of correlation existing between corresponding elements;
   C. repeating step B for a plurality of sub-arrays of elements of said M×N array to generate a correlation array of said correlation values;
   D. identifying a highest correlation value in said correlation array;
   E. repeating steps B, C and D for each sub-array of said X×Y array;
   F. identifying a relative location of said highest correlation values in said correlation arrays to provide a measure of relative distortion of said fingerprint patterns; and
   G. comparing said highest correlation values and said measure of relative distortion to respective predetermined threshold values.

4. The method of claim 3, wherein said comparing operation of Step G includes:
   summing said highest correlation values to produce a total;
   dividing said total by said measure of relative distortion to produce a correlation value-to-distortion ratio; and
   comparing said ratio to a predetermined threshold value.

5. Apparatus for comparing an M×N data array to an X×Y data array, said arrays being representative of fingerprint patterns, comprising:
   means for dividing said X×Y array into a plurality of sub-arrays;
   means for comparing elements of each sub-array of said X×Y array with elements of a plurality of sub-arrays of said M×N array and for generating a correlation value indicative of the degree of correlation existing between elements of each of said sub-arrays and corresponding elements of said plurality of sub-arrays;
   means for identifying a highest of said correlation values for each sub-array;
   means for identifying a relative location of said sub-arrays corresponding to said highest correlation values to provide a measure of relative distortion of said fingerprint patterns; and
   means for comparing said highest correlation values and said measure of relative distortion to respective predetermined threshold values.

6. Apparatus according to claim 5, wherein said means for comparing said highest correlation values and said measure of relative distortion to respective predetermined threshold values comprises:
   means for summing said highest correlation values to produce a total;
   means for dividing said total by said measure of relative distortion to produce a correlation value-to-distortion ratio; and
   means for comparing said ratio to a predetermined threshold value.

7. Apparatus according to claim 5, further comprising opto-electronic scanning means having an optical element with a viewing surface for scanning a fingerprint pattern to generate said M×N array.

8. Apparatus according to claim 7, further comprising transparent film means, positioned over said viewing surface of said optical element, for preventing direct contact between a fingertip and said viewing surface.

9. Apparatus according to claim 7, wherein said opto-electronic scanning means includes positioning means for positioning a fingertip adjacent to said viewing surface of said an optical element.

10. Apparatus according to claim 9, wherein said positioning means comprises a pair of finger guides positioned on either side of a centerline of said optical element, said finger guides being mechanically interconnected and supported so as to remain equidistant from said centerline when positioning said fingertip adjacent to said viewing surface.

11. Apparatus according to claim 10, wherein said transparent film means is movable relative to said viewing surface.

12. Apparatus for identifying fingerprint patterns, comprising:

memory means for storing at least one $X \times Y$ data array representative of a first fingerprint pattern;

scanning means for scanning a second fingerprint pattern and for generating an $M \times N$ data array representative of said second fingerprint pattern;

correlation means for comparing said $M \times N$ data array with said at least one $X \times Y$ data array and for generating a correlation value representative of said comparison;

distortion correction means for compensating for a degree of distortion and misregistration of said second fingerprint pattern relative to said first fingerprint pattern and for generating a measure of relative distortion representative of said degree of distortion; and threshold means for producing an indication signal when said correlation value and said measure of relative distortion are compared to respective threshold values.

13. Apparatus according to claim 12, wherein said distortion correction means includes means for dividing said at least one $X \times Y$ data array into a plurality of sub-arrays for comparison by said correlation means with at least a portion of said $M \times N$ data array.

14. Apparatus according to claim 12, wherein said distortion correction means includes means for dividing said at least one $X \times Y$ data array into four sub-arrays for comparison by said correlation means with at least a portion of said $M \times N$ data array.

15. Apparatus according to claim 12, further comprising finger positioning means for positioning a fingertip adjacent to a viewing surface of an optical element of said scanning means.

16. Apparatus according to claim 15, wherein said positioning means comprises a pair of finger guides positioned on either side of a centerline of said optical element, said finger guides being mechanically interconnected and supported so as to remain equidistant from said centerline when positioning said fingertip adjacent to said viewing surface.

17. Apparatus according to claim 12, further comprising transparent film means, positioned over said viewing surface of said optical element, for preventing direct contact between a fingertip and said viewing surface.

18. Apparatus according to claim 17, wherein said transparent film means is movable relative to said optical element.

19. Apparatus according to claim 12, wherein said memory means contains a plurality of $X \times Y$ data arrays representative of a plurality of fingerprint patterns.

20. Apparatus according to claim 19, further comprising a selection means for selecting said $X \times Y$ data array representative of said first fingerprint pattern from said plurality of $X \times Y$ data arrays for comparison with said $M \times N$ data array representative of said second fingerprint pattern.

* * * * *